US006894226B2

(12) United States Patent
Yokoi et al.

(10) Patent No.: US 6,894,226 B2
(45) Date of Patent: May 17, 2005

(54) COAXIAL CABLES, MULTICORE CABLES, AND ELECTRONIC APPARATUSES USING SUCH CABLES

(75) Inventors: Kiyonori Yokoi, Kanuma (JP); Akinori Mori, Kanuma (JP); Seiji Endo, Kanuma (JP); Akira Yamamoto, Kanuma (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/987,044

(22) Filed: Nov. 13, 2001

(65) Prior Publication Data

US 2002/0029896 A1 Mar. 14, 2002

Related U.S. Application Data

(63) Continuation-in-part of application No. 09/445,126, filed on Dec. 2, 1999, now abandoned.

(30) Foreign Application Priority Data

Apr. 6, 1998 (JP) .......................................... 10-108450
Apr. 1, 1999 (WO) ................................ PCT/JP99/01744

(51) Int. Cl.[7] ................................................ H02B 7/29
(52) U.S. Cl. .................................. 174/102 R; 174/108
(58) Field of Search ........................ 174/36, 28, 102 R, 174/117 FF, 108, 109, 106 R

(56) References Cited

U.S. PATENT DOCUMENTS 3,334,177 A 8/1967 Martin .................... 174/106 R
3,681,514 A 8/1972 Rhoades et al. ............ 174/108
3,813,772 A 6/1974 Adams ................... 174/108 X
4,268,714 A 5/1981 Mori .......................... 174/108
4,358,636 A * 11/1982 Ijff et al. .................... 174/103
4,365,109 A 12/1982 O'Loughlin
4,552,989 A * 11/1985 Sass ........................... 174/103
4,638,114 A * 1/1987 Mori .......................... 174/108
5,061,823 A * 10/1991 Carroll .................. 174/105 R
5,118,905 A 6/1992 Harada ....................... 174/109
5,171,938 A 12/1992 Katsumata et al. ........... 174/36
5,354,954 A 10/1994 Peterson ................. 174/108 X
5,614,319 A * 3/1997 Wessels et al. .......... 174/110 F
5,744,755 A * 4/1998 Gasque, Jr. ................. 174/108

FOREIGN PATENT DOCUMENTS

DE 8804552 6/1988
JP Hei 2-47726 4/1990
JP Hei 2-47728 4/1990

OTHER PUBLICATIONS

European Search Report for counterpart appln. No. EP 99 91 0817, dated Feb. 1, 2002.

* cited by examiner

*Primary Examiner*—Chau N. Nguyen
(74) *Attorney, Agent, or Firm*—Smith, Gambrell & Russell, LLP

(57) ABSTRACT

A coaxial element wire includes a center conductor, an insulation layer, and an outer conductor. The insulation layer is provided around the center conductor, and it has a thickness of 0.15 mm or less. The outer conductor is a ribbon-shaped conductor obtained by pressing a copper or copper alloy round wire into a flat form, without annealing after pressing. This ribbon-shaped conductor is spirally wrapped around the insulation layer to thereby form the coaxial element wire. The coaxial element wire may be covered with a protective jacket, and plural coaxial wire elements may be joined into a common jacket to form a multicore cable.

7 Claims, 5 Drawing Sheets

(A)

(B)

COAXIAL CABLES, MULTICORE CABLES, AND ELECTRONIC APPARATUSES USING SUCH CABLES

REFERENCE TO A RELATED APPLICATION

This application is a continuation-in-part of application Ser. No. 09/445,126, filed Dec. 2, 1999 now abandoned, which is relied upon and incorporated herein by reference.

FIELD OF THE INVENTION

The present invention relates to single-core coaxial element wires or coaxial cables, or multicore coaxial cables which are used for the connection of a liquid crystal display within a notebook computer, or for sensor cables within a medical-purpose ultrasonic wave diagnostic apparatus, and the like, and further, relates to electronic apparatuses using the same.

BACKGROUND OF THE INVENTION

Coaxial cables comprising a coaxial element wire, made up of a center conductor, an insulation layer, and an outer conductor, and a jacket disposed over the coaxial element wire, are known. Included among the types of coaxial cables are a single-core cable formed by providing a single coaxial element wire with a jacket, a multicore cable formed by providing a plurality of single-core cables with a common jacket, and a multicore cable formed by providing a plurality of coaxial element wires with a common jacket. Included among the types of arrangements of coaxial element wires or single-core cables in a multicore cable are a flat-type multicore cable obtained by arranging coaxial element wires or coaxial cables on a plane, and a twisted-layer multicore cable obtained by twisting them together. There are cases where the same type of cables are combined in such a single-core or multicore coaxial cable and where different types, such as communication wires, power wires, and the like, are compounded therein to provide a compound cable.

In the conventional coaxial cables, a metallic tape or a laminate tape obtained by laminating a metallic tape and an insulating film of polyester or the like is generally used as the outer conductor (shield). A braided structure of metallic tapes as disclosed in Japanese Laid-open Utility Model No. Hei 2-47726 and No. Hei 2-47728 is known. The advantage of the outer conductor when it is formed of braided metal tapes is that it does not become loose. On the other hand, its disadvantage is that removal of the outer conductor is troublesome when, for example, making a terminal treatment.

FIG. 4 is a side view showing a conventional coaxial cable employing braided metallic tapes. Referring to FIG. 4, reference numeral 11 denotes a center conductor, 12 denotes an insulation layer, 13 denotes an outer conductor formed by braiding metallic tapes, and 14 denotes a jacket. Metallic tapes obtained by slitting a wide metallic tape are normally used.

However, at the time of slitting the metallic tape, sharp edges such as burrs are produced on the cut surface and such edge portions can injure the insulation layer 12 or cause a voltage concentration on that portion thereby decreasing the dielectric strength of the insulation layer 12.

This problem becomes serious especially when a small-diameter coaxial cable whose insulation layer thickness is as small as 0.15 mm or less is used.

Further, when a conventional coaxial cable is used for connecting devices within an electronic apparatus, especially when it is used in a notebook computer at the rotating portion where the monitor portion and the main body portion are connected, or when it is disposed at the moving portion of a diagnostic sensor cable which moves when changing examined parts of the body, there arises a problem of electrostatic noises produced by friction between the insulation layer 12 and the outer conductor 13 of the moving coaxial cable.

DISCLOSURE OF THE INVENTION

The present invention was made as a result of various investigations which the inventors have conducted on the above described problems, and it can be applied to coaxial cables of various types, as described above.

The inventors have found that a flexible coaxial element wire and a coaxial cable, producing minimal noise when making a mechanical movement, having good mechanical durability, and being small in outer diameter, can be obtained by helically wrapping around the insulation layer a ribbon-shaped conductor obtained by rolling and flattening a copper or copper alloy wire, and thereby constructing an outer conductor, and have thus arrived at the present invention.

First, the invention relates to a coaxial element wire formed of a center conductor, an insulation layer, and an outer conductor, and the coaxial element wire is characterized in that it has an insulation layer of 0.15 mm or less in thickness. The coaxial element wire uses, as the outer conductor, a ribbon-shaped conductor obtained by rolling and flattening a copper or copper alloy round wire, and has the ribbon-shaped conductor helically wrapped around the insulation layer.

Second, the invention relates to a coaxial element wire formed of a center conductor, an insulation layer, and an outer conductor, and the coaxial element wire is characterized in that the insulation layer is disposed around the center conductor in contact therewith. The insulation layer has a thickness of 0.03 mm or more and not greater than 0.15 mm at the portion where the thickness is smallest. The outer conductor is constructed by helically wrapping one or a plurality of ribbon-shaped conductors, whose cross-section is virtually a rectangle having the four corners smoothed, around the insulation layer such that one long side thereof faces the insulation layer. The wrapping angle of the ribbon-shaped conductor with respect to the axis of the coaxial element wire is 45 degrees or more. When the center conductor is provided by twisting a plurality of conductor wires together, the thickness of the insulation layer is given by the thickness at the portion where the smallest value is obtained in the measurement of the insulation layer thickness in the circumferential direction. Further, the invention is characterized in that the ribbon-shaped conductor is made of a metal including copper, and the ribbon-shaped conductor is wrapped around the insulation layer under a tension of 30% or more of the tensile strength of the ribbon-shaped conductor.

Further, the above described coaxial element wire may be provided with a jacket so as to be formed into a single-core coaxial cable.

Further, a plurality of the above described coaxial element wires may be combined and provided with a common jacket so as to be formed into a multicore cable. Coaxial element wires having outer conductors are combined, in contact with each other, without individual jackets. Therefore, even if each of the outer conductors is small, the resistance of the outer conductors does not become large, as a whole. The aforesaid single-core coaxial cables may thus be provided with a common jacket to be formed into a multicore cable.

The invention further relates to an electronic apparatus characterized in that the above described coaxial element wire, coaxial cable, or multicore cable is disposed therein at a place where the wire or cable is subjected to mechanical rotation or bending of the electronic apparatus.

The ribbon-shaped conductor used here, of a virtually rectangular cross section having its four corners smoothed, can be manufactured with ease and at low cost by rolling and flattening a round wire of copper or a copper alloy. In the invention, the ribbon-shaped conductor has no edge that forms an acute angle at the circumference of the cross-section, and therefore, when the same is helically mounted as the outer conductor, harm to the insulation layer or voltage concentration do not occur. Further, such a ribbon-shaped conductor of a virtually rectangular cross section has high mechanical strength and, because it is not braided, it can be removed with no trouble when, for example, making a terminal treatment. Further, through investigation by the inventors, it was found that the noise occurring in a coaxial cable due to rotation or bending at the portion where it is disposed in an electronic apparatus is an electrostatic noise caused by friction between the insulation layer and the outer conductor. Because the outer conductor of the present invention is helically mounted with one long side of the virtually rectangular form of the ribbon-shaped conductor facing the insulation layer, the area of the contact face between the ribbon-shaped conductor and the insulation layer is sufficiently large to increase friction therebetween and, hence impedes the phenomenon of sliding movement of the ribbon-shaped conductor and the insulation layer along each other, thereby suppressing the occurrence of electrostatic noise.

DETAILED DESCRIPTION OF EMBODIMENTS ACCORDING TO THE INVENTION

The invention will be described with reference to the accompanying drawings. The coaxial element wire constituting the coaxial cable of the present invention basically has an insulation layer with a thickness of 0.15 mm or less, and hence, the coaxial element wire can be made smaller in diameter. Accordingly, positive effects of the invention are exhibited especially when it is applied to a coaxial cable or a thin flat type multicore cable for use in wiring in an electronic apparatus which has a small space for wiring and hence requires a decrease in the volume of wires and cables occupying the space.

Figure 1:
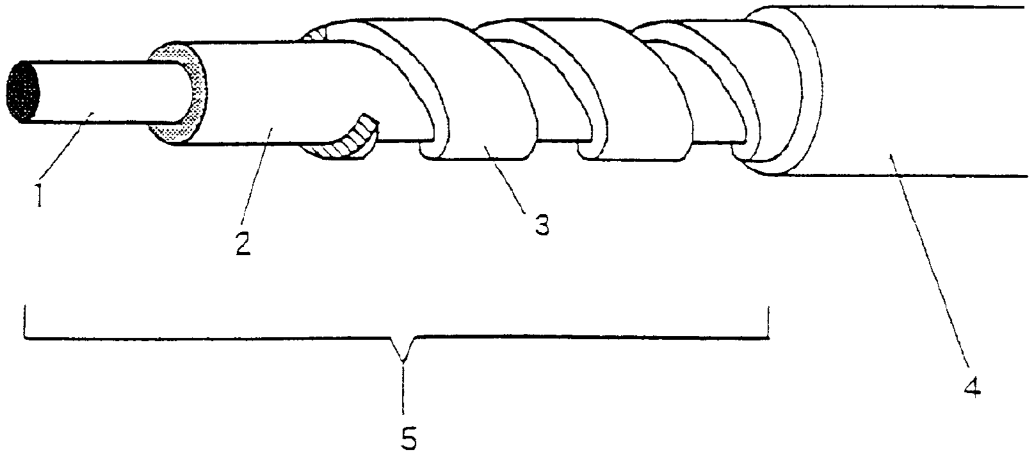
FIG. 1 is a perspective view showing a single-core coaxial cable employing a typical coaxial element wire of the present invention.

Further, the coaxial element wire is constructed by using as the outer conductor a ribbon-shaped conductor obtained by pressing and flattening a copper or copper alloy round wire and helically wrapping the ribbon-shaped conductor around the insulation layer. FIG. 1 is a perspective view schematically showing a single-core coaxial cable employing a typical coaxial element wire of the present invention. Referring to FIG. 1, reference numeral 1 denotes a center conductor of copper, copper alloy, or the like, 2 denotes an insulation layer made of PFA, polyester, polyimide film, or the like, 3 denotes a ribbon-shaped conductor as an outer conductor whose cross-section is virtually a rectangle having its four corners smoothed, and 4 is an outer jacket. The ribbon-shaped conductor 3 can be produced by such a method as chamfering four corners of a rectangular conductor. It can also be manufactured by pressing and flattening a copper or copper alloy round wire, which is advantageous in terms of production cost. The ribbon-shaped conductor is helically wrapped around the insulation layer 2 to provide the outer conductor. In FIG. 1, the combination of the center conductor 1, insulation layer 2, and outer conductor 3 is labeled with reference number 5.

(1) Thickness of the insulation layer: Since the setting position or angle of electronic apparatuses such as notebook computers and sensors for medical purposes are manually changed, there are increasing demands for further downsized and light weight apparatuses. Hence, narrower coaxial cables are being demanded. When a coaxial cable is deformed by rotation or bending of a portion of a device in which it is disposed, strain is imposed on the coaxial cable, especially on its outer conductor, and such strain becomes greater, accompanied by an increase in produced noises, with the increase of the outer diameter. Therefore, the insulation layer 2 and the coaxial element wire constituting the coaxial cable of the invention are required to have a thickness as thin as 0.15 mm or less. While it is preferred that the insulation layer 2 thickness be as small as possible, since it is subjected to deformation by repeated bending or torsion during the service period, it is desired that it be given a thickness of, for example, 0.3 mm or more, which is considered to be the minimum value when mechanical strength and flexibility are taken into account.

(2) Outer conductor: The ribbon-shaped conductor 3, which is formed by pressing and flattening a round wire made of a metal, such as copper, copper alloy, or the like, is helically wrapped around the insulation layer 2 to form the outer conductor.

Since such a ribbon-shaped conductor 3 is obtained by pressing a round wire, the cross section thereof has a smooth form at the four corners, and takes on virtually a retangular form not having any acute edge all along the circumference. The outer conductor is constructed by wrapping the ribbon-shaped conductor 3 around the insulation layer 2 with one long side of the virtually rectangular form facing the insulation layer 2. Because the ribbon-shaped conductor 3 has such a form, it can be provided free from an acute edge as was produced in the slit tape in the conventional art and, therefore, injury to the insulation layer 2 or localization of voltage rarely occurs so that a stabilized insulating withstand-voltage characteristic can be obtained. Further, since a round wire made of copper or copper alloy is pressed and flattened to be used as the ribbon-shaped conductor 3 without annealing, a merit can be obtained such that the ribbon-shaped conductor 3 can be wrapped up so as not to become loose, without the need for braiding as was practiced in the method of the conventional art. When wrapping the ribbon-shaped conductor 3, it must be kept under a tension not impairing the characteristic of the insulation layer 2, while enabling the wrapped up ribbon-shaped conductor to constantly fasten the insulation layer 2, and under such a tension that will not cause the coaxial elemement wire or the coaxial cable to be damaged when the same is bent or twisted. It is preferred that the tension be not smaller than 30% and not greater than 80% of the tensile strength of the ribbon-shaped conductor 3. Further, a layer obtained by depositing a metal on a thin tape may be disposed under the outer conductor. Then, both an improvement in the shielding effect and an increase in the insulating withstand-voltage of the insulation layer 2 can be attained.

Figure 2:
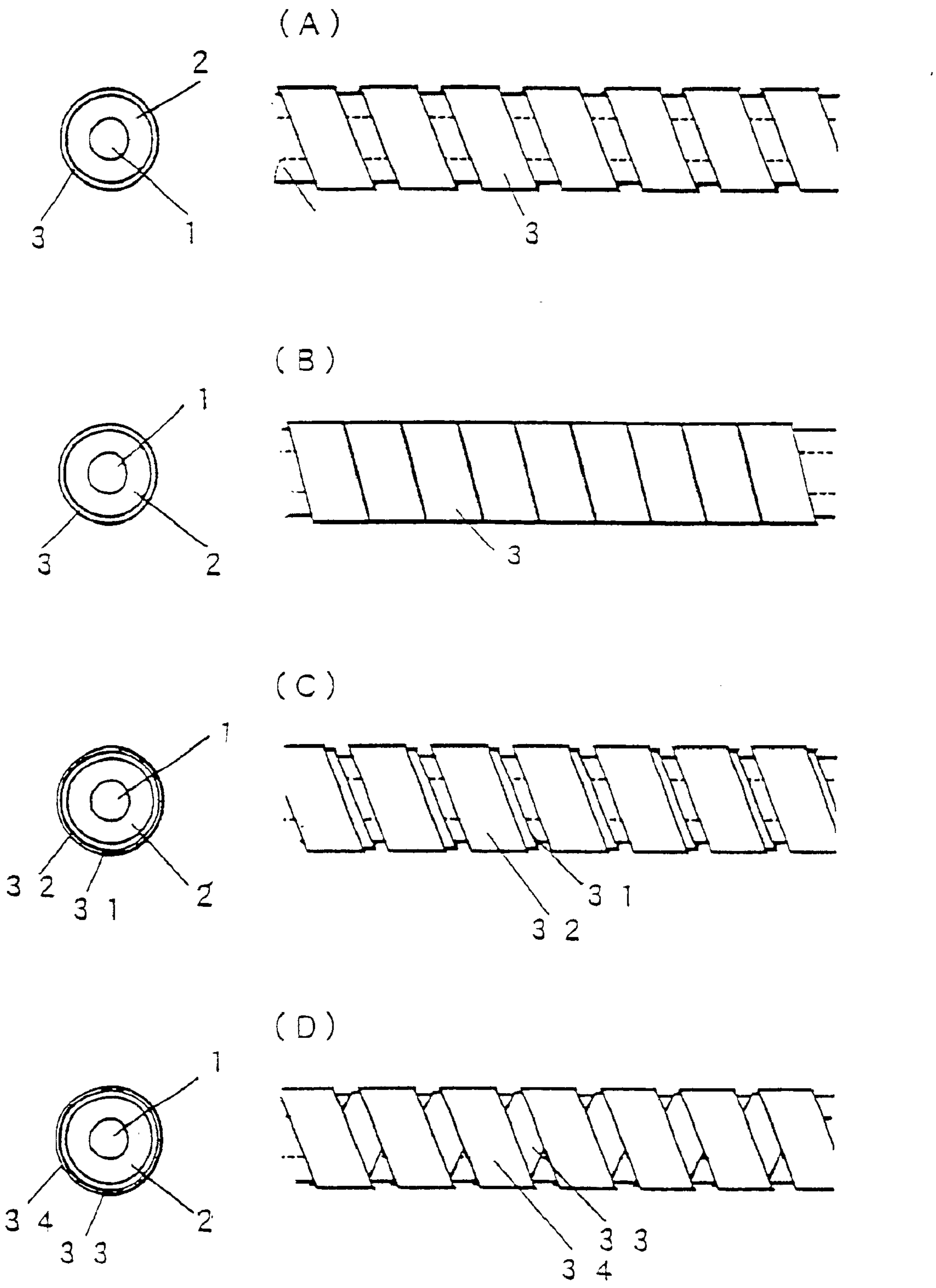
FIGS. 2(A)(1) through 2(D)(2) are schematic views showing various manners of wrapping a ribbon-shaped conductor according to the invention.

The wrapping angle (Φ)) of the ribbon-shaped conductor 3 is preferably 45 degrees or more for providing flexibility. (The wrapping angle Φ) is illustrated in FIG. 2(A)(2).) While it is more preferably 60 degrees or more, if it is increased close to 90 degrees, the productivity is greatly decreased and it is undesirable. Therefore, the maximum limit for the wrapping angle Φ is approximately 80 degrees. As to the size of the outer conductor, it is desired that the thickness be 0.03 mm or less in order to reduce the outer diameter of the coaxial element wire and the coaxial cable and, in view of the mechanical strength, it is desired that it be not smaller than 0.01 mm. From the viewpoint of maintaining the characteristics which the outer conductor should have, it is better for the ribbon-shaped conductor 3 to have a large width, preferably 0.1 mm or more. However, from the point of view of the operability of the wrapping operation and the cost of production, one having a width of 0.3 mm or less is preferable because that small of a width is economical in material costs and allows the wrapping work to be made free of wrinkle formation. Especially from the point of view of electrical characteristics, mechinical characteristics, and workability, a tape-shaped conductor 0.025 mm thick and 0.20 mm wide manufactured by pressing a round wire of 0.08 mm in outer diameter or a tape-shaped conductor 0.012 mm thick and 0.18 mm wide manufactured by pressing a round wire of 0.05 mm in outer diameter have excellent characteristics as the outer conductor.

(3) Multicore cable: Especially in the case of the multicore cable of the present invention, regardless of whether manufactured by having coaxial element wires assembled and provided with a common jacket, by having single-core coaxial cables assemble and provided with a common jacket, or by having coaxial element wires having outer conductors combined and in contact with one another without individual jackets, there is no danger of the insulation layer 2 being injured by the outer conductor even if the coaxial element wires subjected to a force applied from the side, i.e., a lateral pressure, when they are twisted for assembling work or the like, since the outer conductor of the coaxial element wires has a smooth surface free from an acute edge along its circumference as a result of manufacture from a round wire by pressing.

Hence, a risk that the dielectric strength of the common jacket layer 2 will become deteriorated can be avoided. Thus, thinner-walled and smaller-diametered multicore cable, having the mechanical durability and electrical characteristic required of the multicore cable, can be realized.

The invention will be described by example in the following examples.

EXAMPLE 1

Figure 5:
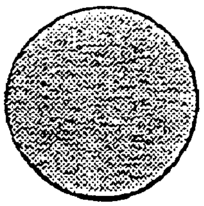
FIGS. 5(A) and 5(B) are diagrams showing a cross-sectional view of a ribbon-shaped conductor of the invention compared with a round wire before being pressed.
Figure 5:
Figure 3:
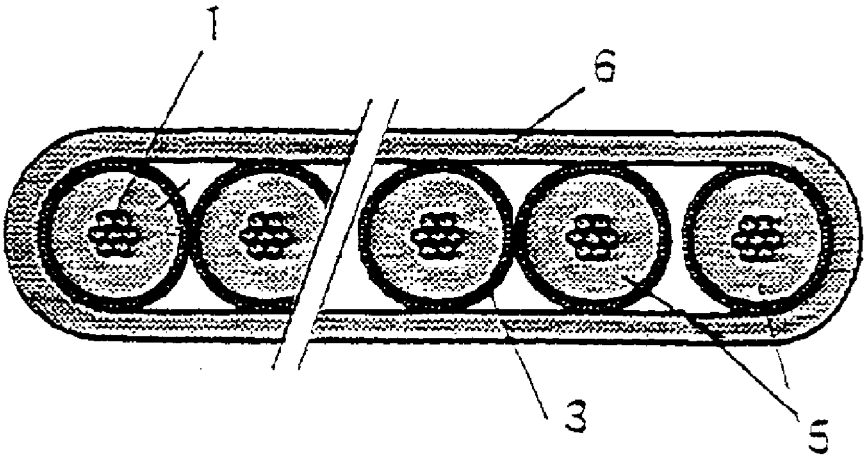

For use as the outer conductor, a tin-plated round wire 40 of a copper alloy of 0.05 mm in outer diameter having a cross section as shown in FIG. 5(A) was pressed and thereby a long ribbon-shaped conductor 42 0.012 mm thick and 0.18 mm wide having a cross section as shown in FIG. 5(B) was manufactured. As the insulation layer 2, PFA (tetrafluoroethylene-perfinoroalkylvinylether copolymer) resin was extruded to over the periphery of a center conductor 1 of 0.09 mm in outer diameter (seven tin-plate copper-alloy wires of 30 μm in outer diameter being stranded) by a known extruding and covering method so that a circular profile of 0.23 mm in outer diameter is formed. Then, the above described tape-shaped conductor (42) was helically wrapped around the same, so as to form an angle Φ of 68 degrees with respect to the axis of the coaxial element wire, by open wrapping as shown in FIGS. 2(A)(1) and 2(A)(2), spaced apart at a pitch of 0.29 mm, under a tension of 60 gf per piece. In this manner, a coaxial element wire was manufactured.

Withstand voltage test: Using a coaxial element wire of 300 m length, DC voltage of 1000 V was applied between the center conductor 1 and the outer conductor for one minute, and the occurrence of any dielectric breakdown was checked for. As a result, there as no fault observed, such as to break down the insulation layer 2, with respect to the withstand voltage. Thus, it has been confirmed that the coaxial element wire has good characteristics as a coaxial cable.

Withstand voltage test: Using a coaxial element wire of 300 m length, a DC voltage of 1000 V was applied between the center conductor 1 and the outer conductor 3 for one minute, and the occurrence of any dielectric breakdown was checked for. As a result, there was no fault observed, such as to break down the insulation layer 2, with respect to the withstand voltage. Thus, it has been confirmed that the coaxial element wire has good characteristics as a coaxial cable.

Figure 6:
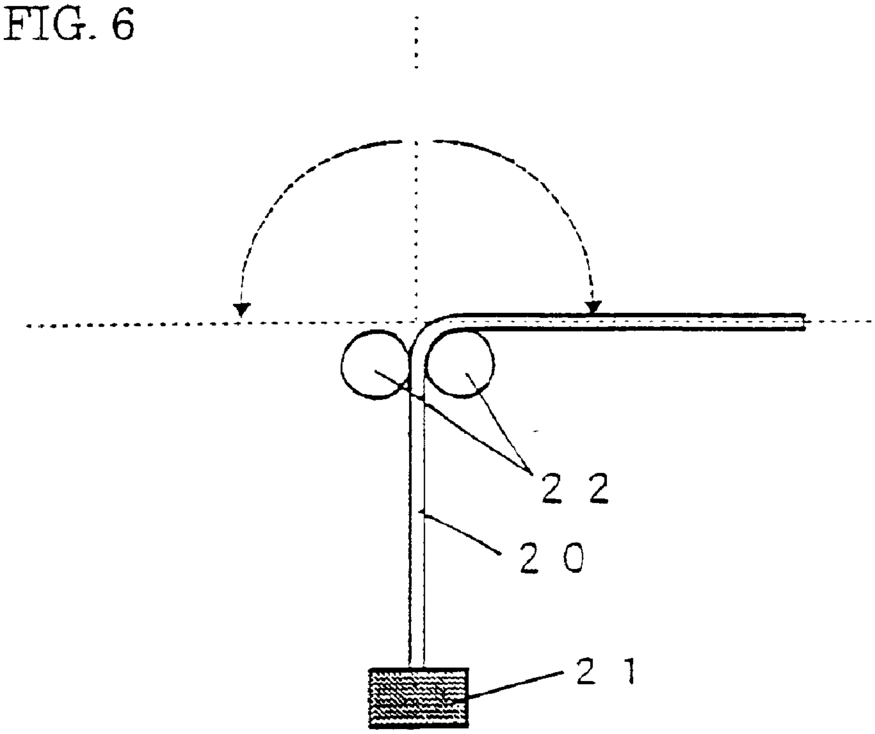
FIG. 6 is a diagram explanatory of a bending test of a coaxial element wire.

Mandrel bending test: The testing method is schematically shown in FIG. 6. Having a coaxial element wire 20 held, at its center portion, between two metallic bars 22 of 5 mm in outer diameter and having a load 21 of 50 gf attached to its lower end, the upper end portion was bent so as to be wrapped around the metallic bar on one side at 90 degrees, then straightened, and then wrapped around the metallic bar on the other side at 90 degrees. Counting a set of bending to one side and the other side as one cycle, 1000 cycles of the bending operation were carried out at a rate of 30 cycles/minute. Thereafter, the withstand voltage test as described above was carried out on the article, in which no inferiority in withstand voltage was observed. Thus, it has been confirmed that the coaxial element wire has excellent characteristics against repeated bending.

Figure 7:
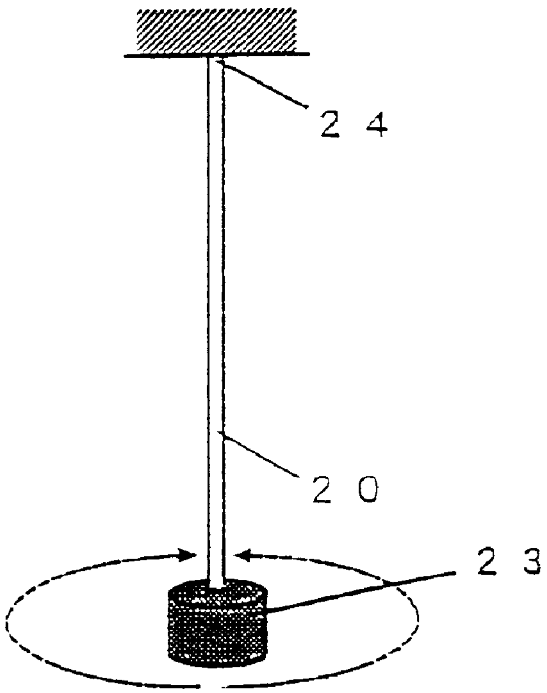
FIG. 7 is a diagram explanatory of a torsion test of a coaxial element wire.

Torsion test: The testing method is schematically shown in FIG. 7. A coaxial element wire 20 of a length of 20 cm was vertically hanged down having the upper end thereof fixed to an upper end fixing point 24 and having a load 23 of 50 gf attached to the lower end thereof. The load 23 was caused to alternately turn 180 degrees around the center axis of the coaxial cable clockwise and counterclockwise. Counting a set of twisting clockwise and counterclockwise as one cycle, 1000 cycles of the twisting operation were carried out at the rate of 30 cycles/minute. Thereafter, the withstand voltage test as described above was carried out on the coaxial element wire, in which no inferiority in withstand voltage was observed. Thus, it has been confirmed that the coaxial element wire has excellent characteristics against repeated twisting.

Figure 4:
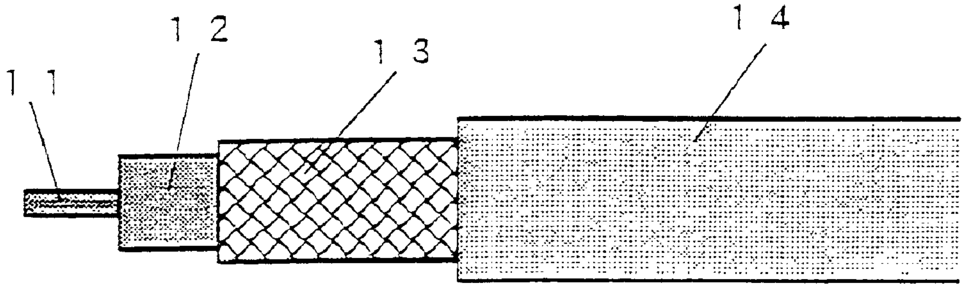
FIG. 4 PRIOR ART
FIG. 4 is a side view showing a conventional coaxial cable employing braided metallic tapes.

Electrostatic noise characteristic: In order to further evaluate the value of the electrostatic noise produced at the time when an abrupt deformation is caused to a coaxial element wire, a coaxial element wire of a length of 50 cm was horizontally stretched, a cotton wire of a length of 20 cm was attached to the center thereof, and a load of 20 gf was attached to the other end of the cotton wire. While the voltage between the center conductor and the outer conductor of the coaxial element wire was measured with a voltmeter, the weight was allowed to fall by its own weight from the altitude of the coaxial element wire, and the electrostatic noise characteristic was measured as the maximum value of the voltage variation. As a result of the measurements performed ten times in the same manner, a maximum of 2.5 mV was obtained as the maximum voltage variation. Meanwhile, a similar evaluation was made on a coaxial element wire having an outer conductor made of the conventional braided type shown in FIG. 4. At this time, the maximum value of the voltage variation was as high as 100 mV. From this result, it has been confirmed that substantial improvement in attenuating the electrostatic noise can be obtained by utilizing the present invention.

Figure 3:
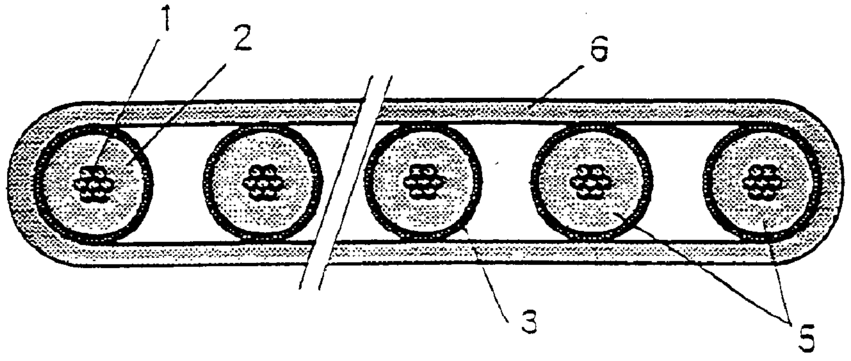
FIGS. 3(A) and 3(B) are schematic diagrams showing a cross-sectional view of flat cables as examples of multicore cables according to the invention.

Then, as shown in FIG. 3(A), 10 pieces of coaxial element wires, each including a central conductor 1, an insulating layer 2, and an outer conductor according to the invention, were arranged in parallel, and they were wrapped up by an adhesive-coated polyester tape, as a jacket 6, so as to be formed into a flat type multicore cable. Further, 30 pieces of said single-core coaxial wires were twisted together and provided with a common jacket on the outside. Thereby, a multicore cable being small in diameter while having flexibility and mechanical durability required of a multicore cable was obtained. Also, excellent insulating and other characteristics have been confirmed with the multicore cables thus obtained.

Similarly, as shown in FIG. 3(B), 10 pieces of coaxial element wires, each including a central conductor 1, an insulating layer 2, and an outer conductor according to the invention, might be arranged in parallel, with outer conductors of the wires in contact with each other, and then wrapped up by an adhesive-coated polyester tape, as a jacket 6, so as to be formed into a flat type multicore cable. In this way, a multicore cable being small in diameter while having flexibility and mechanical durability required of a multicore cable was obtained, and even if each of the outer conductors is small, the resistance of the outer conductors does not become large overall. Also, excellent insulating and other characteristics can be achieved with the multicore cables thus obtained.

EXAMPLE 2

In Example 2, a coaxial element wire was produced by helical wrapping of a ribbon-shaped conductor 3 under a tension of 55 gf per piece, at a pitch of 0.18 mm, at an angle of 75 degrees, and in a butt-joined manner as shown in FIGS. 2(B)(1) and 2(B)(2). This coaxial element wire was excellent in all of the withstand voltage characteristics, bending characteristics, torsion characteristics, and electrostatic noise characteristics. Using this coaxial element wire, a single-core coaxial cable, a flat type multicore cable, and a multicore cable were produced in the same manner as in Example 1.

It was confirmed also with the thus obtained coaxial cable and multicore cables that their insulating characteristics and other characteristics are good.

EXAMPLE 3

In Example 3, a coaxial element wire was produced by helical wrapping of ribbon-shaped conductors 31 and 32, under a tension of 65 gf per piece, at a pitch of 0.29 mm, and at an angle of 68 degrees (double sheets were wrapped, each in open wrapping, in the same direction), as shown in FIGS. 2(C)(1) and 2(C)(2). The coaxial element wire shown in FIGS. 2(D)(1) and 2(D)(2) was also produced by wrapping ribbon-shaped conductors 33 and 34 at a pitch of 0.29 mm and at an angle of 68 degrees, with the second conductor 34 wrapped in the opposite direction from the first conductor 33. These coaxial element wires had excellent withstand voltage characteristics, bending characteristics, torsion characteristics, and electrostatic noise characteristics and especially excellent shielding characteristics of the outer conductor layer. Also by the use of these coaxial element wires, a single-core coaxial cable, a flat type multicore cable, and a multicore cable were produced in the same manner as in Example 1.

Excellent insulating characteristics and other characteristics were also confirmed with the thus obtained coaxial cable and multicore cables.

Industrial Applicability

Since, as described above, a coaxial element wire is produced by using a ribbon-shaped conductor of a virtually rectangular cross-section with the four corners thereof smoothed as an outer conductor and wrapping the ribbon-shaped conductor around an insulation layer to provide the outer conductor, a flexible, small-diameter coaxial cable excellent in mechanical durability can be provided. By combining a plurality of such coaxial element wires or coaxial cables and covering the same with a jacket, as shown in FIGS. 3(A) and 3(B), it is also possible to use the product as a multicore cable. Further, by using the thus obtained coaxial cable or multicore cable in a rotating portion or a bending portion of an electronic apparatus, an electronic apparatus maintaining excellent insulating characteristics for a long time and producing little electrostatic noise can be obtained and high quality and high speed intra-apparatus signal transmission can be achieved.

We claim:

1. A coaxial element wire, comprising:

a center conductor, a non-electrically conductive insulation layer, disposed around said center conductor and in contact therewith, having a thickness of 0.03 mm or more and no greater than 0.15 mm at a portion of the insulation layer where the thickness is smallest, and an outer conductor, made by:

pressing a copper or copper alloy round wire into a flat form, without annealing after pressing, to thereby provide a ribbon-shaped conductor of a virtually rectangular cross-section with its four corners smoothed, and then helically wrapping said ribbon-shaped conductor, under a tension of at least 30% of the tensile strength of said ribbon-shaped conductor, around said insulation layer with one long side thereof facing said insulation layer, wherein a wrapping angle of said ribbon-shaped conductor with respect to an axis of said coaxial element wire is 45 degrees or more.

2. The coaxial wire element according to claim 1, wherein the outer conductor is helically wrapped such that adjacent wrappings of the outer conductor butt against one another.

3. The coaxial wire element according to claim 1, wherein the first ribbon-shaped conductor is helically wrapped in a first direction and a second ribbon-shaped conductor is helically wrapped in the first direction.

4. The coaxial wire element according to claim 3, wherein the second ribbon-shaped conductor overlaps the first ribbon-shaped conductor.

5. The coaxial wire element according to claim 1, wherein the ribbon-shaped conductor is helically wrapped in a first direction, and a second ribbon-shaped conductor is helically wrapped in a second direction opposite the first direction.

6. A method of making a coaxial element wire, comprising:

providing a center conductor;

providing a non-electrically conductive insulation layer around the center conductor, wherein the insulation layer has a thickness of 0.15 mm or less;

providing an outer conductor formed by pressing a copper or copper alloy round wire into a flat form, without annealing after pressing, to thereby provide a ribbon-shaped conductor; and spirally wrapping the ribbon-shaped conductor around the insulation layer with one long side thereof facing said insulation layer, wherein a wrapping angle of said ribbon-shaped conductor with respect to an axis of said coaxial element wire is more than 45 degrees, wherein the ribbon-shaped conductor is spirally wrapped around the insulation layer under a tension of at least 30% of the tensile strength of the conductor.

7. A method of making a coaxial element wire, comprising:

providing a center conductor;

providing a non-electrically conductive insulation layer around the center conductor and in contact therewith, wherein a thickness of the insulation layer is 0.03 mm or more and not greater than 0.15 mm at a portion where the thickness is smallest;

providing an outer conductor formed by pressing a copper or copper alloy round wire into a flat form, without annealing after pressing, to thereby provide a ribbon-shaped conductor of a virtually rectangular cross-section with its four corners smoothed; and helically wrapping one or a plurality of the ribbon-shaped conductors around the insulation layer with one long side thereof facing the insulation layer, wherein a wrapping angle of the ribbon-shaped conductor with respect to an axis of the coaxial element wire is more than 45 degrees, wherein the ribbon-shaped conductor is spirally wrapped around the insulation layer under a tension of at least 30% of the tensile strength of the conductor.

* * * * *